United States Patent [19]

Tse

[11] 4,353,852

[45] Oct. 12, 1982

[54] PELLETIZING METHOD AND APPARATUS

[75] Inventor: Samuel Y. Tse, Calgary, Canada

[73] Assignee: Procor Limited-Procor Limitée, Oakville, Canada

[21] Appl. No.: 228,446

[22] Filed: Jan. 26, 1981

Related U.S. Application Data

[62] Division of Ser. No. 88,235, Oct. 25, 1979, Pat. No. 4,272,234.

[51] Int. Cl.$^3$ .............................................. B01J 2/12
[52] U.S. Cl. .................................... 264/37; 264/117; 425/222
[58] Field of Search .................. 264/117, 37; 425/222

[56] References Cited

U.S. PATENT DOCUMENTS

| | | | |
|---|---|---|---|
| 4,108,932 | 8/1978 | Takewell | 264/117 |
| 4,213,924 | 7/1980 | Shirley, Jr. | 264/117 |
| 4,293,324 | 10/1981 | Saeman | 264/117 |

Primary Examiner—James R. Hall
Attorney, Agent, or Firm—Dressler, Goldsmith, Shore, Sutker & Milnamow, Ltd.

[57] ABSTRACT

Solid sulfur pellets are made by dropping sulfur particles in two distinct curtains of particles within a drum having a tumbling bed of such particles. The larger curtain of particles is sprayed with molten sulfur and the smaller is sprayed with water above the bed. This indirect application of water keeps the temperature of the bed as well as the other curtain of particles being sprayed with sulfur within predetermined temperature ranges which produce high quality sulfur pellets. Dust emissions are prevented by classifying as to size a third falling curtain of recycled particles and spraying molten sulfur on the side containing dust particles. Seed nuclei are produced by intermittently raising the temperature of the tumbling particle bed about 40° F. for short periods of time.

33 Claims, 4 Drawing Figures

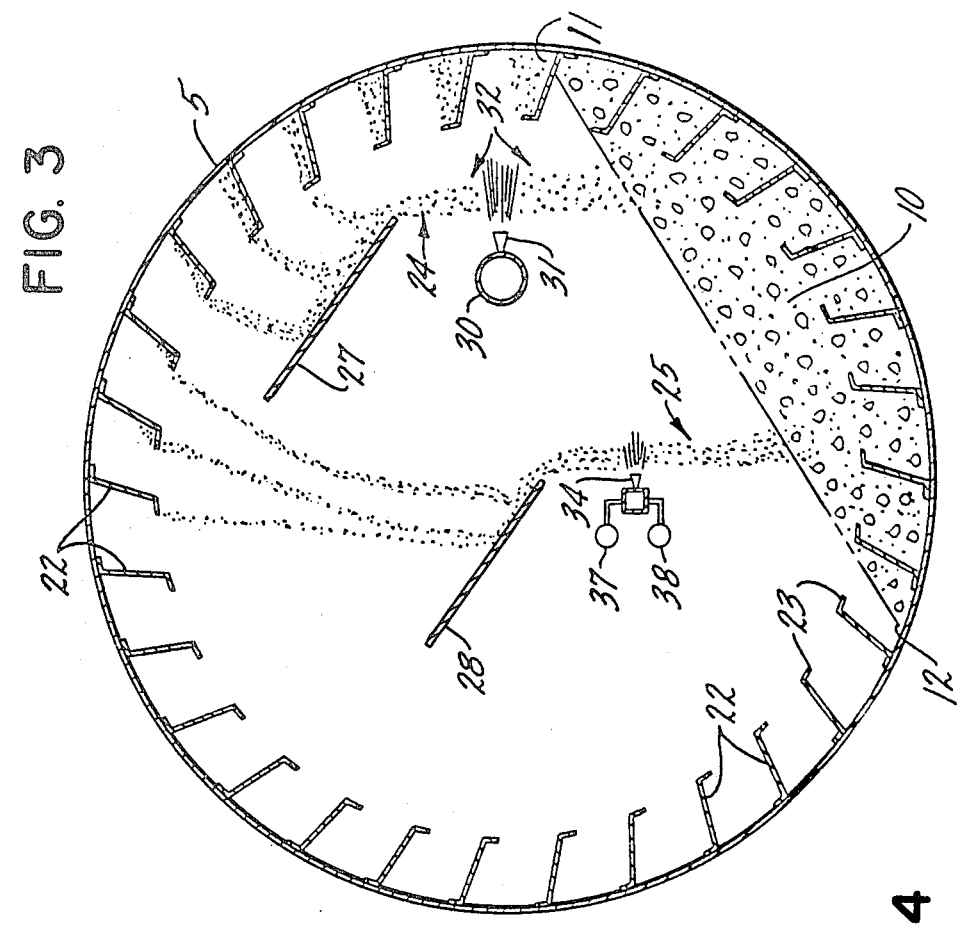
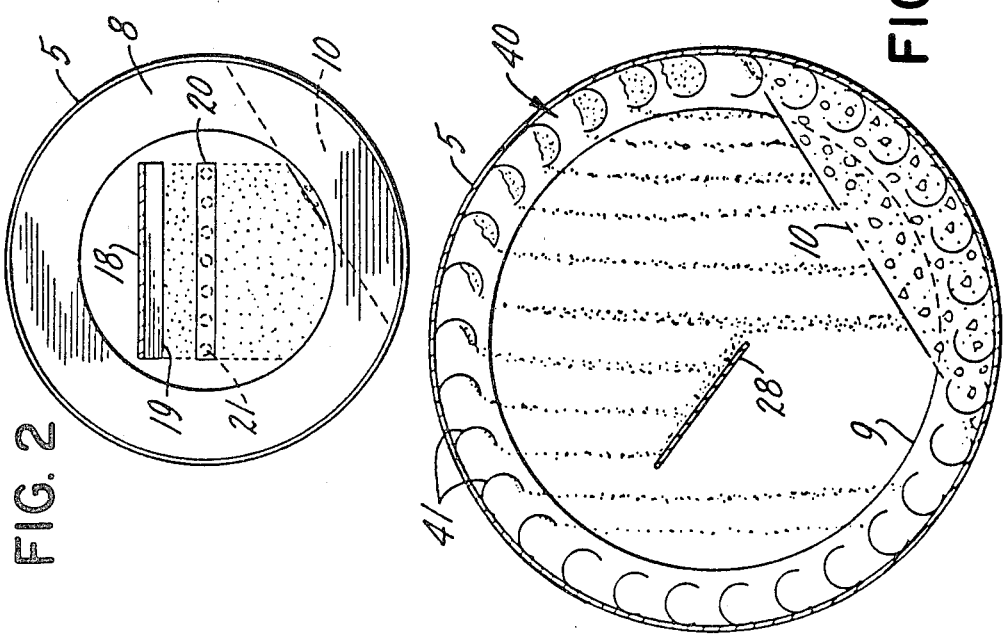

PELLETIZING METHOD AND APPARATUS

This application is a division of application Ser. No. 088,235, filed Oct. 25, 1979, now U.S. Pat. No. 4,272,234.

BACKGROUND OF THE INVENTION

This invention relates to methods for producing pellets, and more particularly to the production of relatively small sulfur pellets.

Pellets have been made by spraying molten or dissolved chemicals onto falling particles, and pellets have been coated with sulfur by this technique. However, this method has not been used to produce solid sulfur pellets.

OBJECTIVES OF THE INVENTION

Accordingly, it is an object of this invention to provide improved methods for producing sulfur pellets.

Another object is to control the temperature of a falling curtain of particles as they are sprayed with molten chemical.

Another object is to reduce air pollution resulting from escape of sulfur dust.

Another object is to produce seed nuclei for coating with molten sulfur without requiring specialized equipment.

Another object is to eliminate problems caused by spraying water directly on a bed of rotating particles that are being coated with a molten chemical.

Another object is to reduce breakage of falling particles in the drum of a sulfur pelletizing system.

Another object is to produce high density, relatively moisture-free, generally spherical sulfur pellets that do not have voids or surface stress areas, and that have a predetermined relatively uniform size.

Another object is to provide pellet producing methods that are continuously operating, easy to adjust, maintain and control, relatively inexpensive, pollution-free, and which do not contain defects found in the prior art.

Other objects and advantages of the invention will be apparent from the specification and claims, and the scope of the invention will be pointed out in the claims.

SUMMARY OF THE INVENTION

Briefly stated, according to one aspect of the invention, a zone where falling particles are sprayed with a coating substance is cooled indirectly by wetting some of the particles at a different location and then dropping them through the zone. Another aspect of the invention involves two separated and distinct curtains of particles that are formed by deflection, and one curtain is sprayed with molten sulfur while the other is sprayed with water. Another aspect of the invention results in the production of seed particles by raising the temperature of a rotating bed of sulfur particles by about 40° F. for a short time. Another aspect of the invention reduces dust emission by concentrating dust particles on one side of a falling curtain of particles and spraying molten sulfur on that side of the curtain. Another aspect of this invention involves increasing the amount of sulfur sprayed into a curtain of falling particles as the average particle size increases.

DESCRIPTION OF THE DRAWING

FIG. 2 is a cross sectional view taken along the line 2—2 in FIG. 1.

FIG. 3 is an enlarged cross sectional view taken along the line 3—3 in FIG. 1.

FIG. 4 is an enlarged cross sectional view taken along the line 4—4 in FIG. 1.

DESCRIPTION OF THE INVENTION

Figure 1:
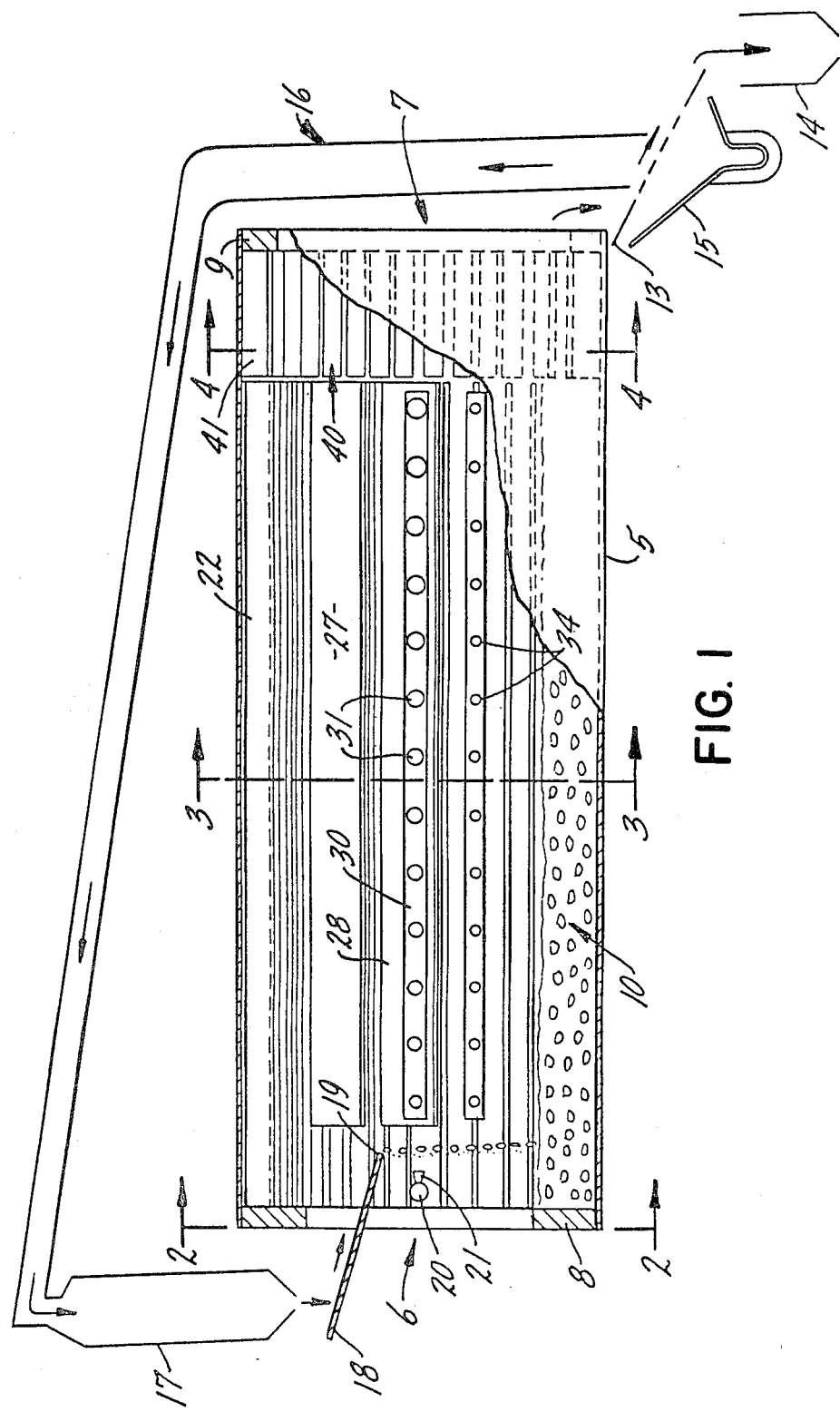
FIG. 1 is a schematic, partially cross sectional side view of a sulfur pelletizing system in accord with this invention.

The drawing shows a sulfur pelletizing system in which an open-ended, elongated hollow, cylindrical, rotatable drum 5 has its central axis tilted slightly (i.e. less than 2°) with respect to the horizon from its entrance end 6 to its discharge end 7. End 6 is partially closed by an annular ring 8 and end 7 is partially closed by a similar ring 9. Ring 8 is wider than ring 9 in the radial direction, and end 6 is slightly higher than end 7 because of the slope of the drum axis. A bed 10 of solid sulfur particles tumbles in the bottom of drum 5 as the drum is rotated by conventional means (not illustrated). As drum 5 rotates, one elongated edge 11 of bed 10 is elevated above the other elongated edge 12. The particles in bed 10 range in size from microscopic dust particles to the full sized, generally spherical pellets having a predetermined diameter in the range of about 2 to 20 m.m. that are the end product of this invention. The particles in bed 10 gradually move from end 6 to end 7 as drum 5 rotates, and then fall over the smaller discharge end ring 9 and out of drum 5 on to a screen 13 having openings of a predetermined size. Pellets having a diameter larger than the holes in screen 13 tumble down the screen and into a product hopper or storage silo 14. Particles that fall through screen 13 are guided by hopper 15 to conventional conveyor means 16 which transports these undersized particles to a particle recycle hopper 17.

The particles in hopper 17 vary in size from microscopic dust to almost pellet-sized particles which barely passed through the holes in screen 13. Particles are fed from hopper 17 on to a feed chute or conveyor 18 having a terminal end 19 that extends into the entrance opening at end 6. The particles from hopper 17 fall off the end 19 and form a falling curtain or shower of particles that extends down to bed 10. As the particles fed on to conveyor 18 travel down the conveyor into the interior of drum 5, the agitation and vibration to which they are subjected may classify the particles as to size, or such classification may be achieved by vibrating conveyor 18 in any known manner. The largest particles will rise to the top while the dust falls to the bottom of the layer of particles moving down conveyor 18. Thus, as the particles fall off the end 19 of the conveyor, most of the dust particles are concentrated at the surface of the falling curtain facing the outside of drum 5. To reduce the emission of dust from the system, a transverse header 20 having several nozzles 21 is located under conveyor 18 close to edge 19 on the side of the curtain of falling particles containing the concentration of dust. Molten sulfur is sprayed from nozzles 21 on to the curtain of particles. Since the dust is concentrated at the side of the falling curtain of particles closest to the spray nozzles, most of the dust is picked up by the molten sulfur. It is also possible to put an additional set of spray nozzles on the other side of the curtain of falling particles to further reduce dust emissions. To enable the sulfur spray to hit most of the dust particles, this curtain of particles should be relatively thin (e.g. about 1 inch).

Drum 5 rotates in a counterclockwise direction when viewed in FIGS. 2–4. A series of essentially identical particle lifting flights 22 are equally spaced around the inside surface of drum 5, and project generally toward the center of the drum. Flights 22 extend longitudinally for about 80–90% of the length of drum 5. As flights 22 move through bed 10, they scoop particles from the bed and raise the particles to the upper portion of drum 5. Flights 22 are flat with short, obtusely angled tips 23 so that each flight will have dropped essentially all of the particles it is carrying by the time the flight has moved a short distance past the highest point in drum 5. This produces a concentrated shower of falling particles in the right hand quadrants of drum 5, as seen in FIG. 3, with a much smaller number of particles falling into the left hand quadrants near the vertical center line of the drum.

Drum 5 has means located within it for deflecting the shower of falling particles into two, separated, distinct, generally continuous curtains 24 and 25 which fall into bed 10 at spaced locations. A first elongated deflector plate 27 extending lengthwise of drum 5 is located above the center of the drum, with at least a major portion of plate 27 being located in that upper quadrant of the drum, when viewed in a plane perpendicular to the axis of the drum, which contains the highest ascending flights 22. Such particles are deflected by plate 27 into a relatively thick (e.g. 9–12 inches) first curtain 24 of particles that fall into bed 10 between the center of the bed and its elevated edge 11. A second elongated deflector plate 28 extending for the full length of drum 5 is located near the center of the drum, with at least a major portion of plate 28 being located in the quadrants of the drum, when viewed in a plane perpendicular to the axis of the drum, which contain the descending flights 22. Plate 28 should be wide enough to be hit by substantially all of the particles which fall beyond plate 27 in the direction of drum rotation. Such particles are deflected by plate 28 into a relatively thin (e.g. one inch) second curtain 25 of particles that fall into bed 10 between the center of the bed and its lower edge 12. Thus, plate 28 reduces breakage of falling particles by preventing the particles from striking the exposed tips 23 of flights 22 near the bottom of drum 5. Plates 27 and 28 should be sloped at an angle of at least about 35° counter to the direction of drum rotation.

A steam-jacketed molten sulfur header 30 having a series of sulfur spray nozzles 31 spaced therealong extends longitudinally of drum 5 beneath plate 27. Nozzles 31 spray atomized molten sulfur at a pressure in the range of about 200–500 p.s.i. and a temperature above 260° F. into a zone 32 through which the first curtain 24 of particles falls. The particles in bed 10 increase in average size as they migrate from entrance end 6 to discharge end 7, so the amount of sulfur sprayed into curtains 24 should be increased in the direction of particle migration. This can be accomplished by increasing the pressure at the nozzles 31 from entrance end 6 to discharge end 7, or as shown in FIG. 1, by increasing the size of the nozzles 31 from the entrance end to the discharge end of drum 5. Additional headers and series of spaced nozzles may be aligned parallel with those shown herein. The stationary portions of the apparatus located within drum 5 should be supported in conventional manner by means (not illustrated) extending outside of the drum.

The temperature of zone 32 through which particles fall should be lowered to the range of about 160°–200° F. despite the hot sulfur sprayed by nozzles 31. A direct spraying of water in this zone or into bed 10 will result in poor quality non-uniform pellets having surface defects and voids. Therefore, water must be brought to zone 32 by indirect methods such as removing a small number of particles from bed 10, wetting the removed particles, and dropping the wetted particles through zone 32. Evaporation of the water from the particles as they fall through zone 32 lowers the temperature of the zone to the required range.

Wetting of particles while they are removed from bed 10 can be accomplished by locating a series of longitudinally spaced humidification nozzles 34 underneath second plate 28 in the lower portion of drum 5 near its center where nozzles 34 can spray a liquid into second curtain 25 above bed 10. A water header 37 and a compressed air header 38 feed into nozzles 34, and atomized water is sprayed on the surface of the falling particles in second curtain 25. After the moist particles drop into bed 10, they are mixed with the unwetted particles and some of their moisture is evaporated because of the higher surrounding temperature; this keeps bed 10 in the temperature range of about 120°–180° F. required for production of quality pellets. As drum 5 rotates, the mixture of wetted and other particles is elevated above zone 32 by flights 22 and dropped on to plate 27. Most of the wetted particles are deflected into first curtain 24, where the rest of their moisture is released to the surrounding air by evaporation. This lowers the temperature of zone 32. The spray from nozzles 34 also humidifies and lowers the temperature of air flowing countercurrent through drum 5.

The discharge end 7 of drum 5 has a cooling section 40 in which the temperature of the particles is cooled to the range of about 120°–160° F. This facilitates handling of the finished pellets by eliminating stickyness and dust that often forms when the pellets reach ambient temperature. The shape of lifting flights 41 in section 40 is different from that of the flights 22 in the rest of drum 5. Flights 41 have a generally C-shaped or semicircular cross section that causes them to distribute falling particles generally uniformly throughout cooling section 40, except where the particles hit plate 28 and are deflected away from the exposed tips of the flights. Outside air is drawn into end 7 and is forced through drum 5 and out end 6 in any conventional manner. This cools the particles that fall over rim 9 on to screen 13 to a temperature lower than the average operating temperature in drum 5.

The full sized sulfur pellets that do not pass through screen 13 are not returned to drum 5, and they must be replaced with seed or nuclei particles to keep the system operating continuously. These small particles can be produced in drum 5 by intermittantly raising the temperature of bed 10 by at least about 40° F. for brief periods. When the temperature of bed 10 is raised to the range of about 160°–220° F., the liquid sulfur sprayed on the falling particles in zone 32 will not completely solidify immediately. The sprayed sulfur coating will remain slightly soft or plastic on the surface of the particles. As the particles with this plastic coating are tumbled in bed 10, the abrading action of the other particles will rub or break off small pieces of this soft coating having a diameter in the size range of about 0.1 to 1.0 m.m. After the broken-off pieces solidify, they become the seed nuclei of the system. The temperature of bed 10 need be raised for only about 2% of the time to produce sufficient seed nuclei to keep the system operating continuously. For example, in an installation producing twenty long tons per hour of sulfur pellets, the temperature of bed 10 was raised about 40° F. for about ten minutes every eight hours of drum operating time and sufficient seed nuclei were produced.

It has thus been shown that by the practice of this invention solid sulfur pellets can be produced continuously by spraying molten sulfur into a curtain 24 of falling particles that were lifted from a rotating bed 10 of particles. The temperature of the bed and of the curtain of falling particles are lowered to the temperature ranges that result in quality pellets without spraying water directly on the bed or into the falling curtain. Instead water is sprayed into a separate and distinct curtain 25 of falling particles at a location spaced from the first curtain 24. This prevents the water spray from interfering with the adhesion or shape of the molten sulfur coating the surface of the sprayed particles. Breakage of particles is reduced by plate 28. Dust emissions are controlled by classifying dust particles to one side of the particle return stream at entrance end 6, and then spraying that side of the stream with molten sulfur. This greatly enlarges the size of the dust particles by coating them with sulfur. Seed nuclei are generated economically without lowering the quality of the final pellets by intermittantly raising the temperature of bed 10 to a level that keeps the coating on the freshly sprayed particles plastic for only a short time. This permits the abrasion between particles tumbling in bed 10 to scrape off small pieces of sulfur that solidify into the seed nuclei.

While the present invention has been described with reference to particular embodiments, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. The method of maintaining within a predetermined range the temperature of a zone where solid particles falling through the air into a rotating bed of such particles are sprayed with a substance which adheres to the surface of the falling particles, comprising the steps of:
   A. removing some of the particles from said bed;
   B. wetting the removed particles with a liquid; and
   C. dropping the wetted particles into said zone, whereby evaporation of the liquid from said wetted particles as they pass through said zone lowers the temperature of said zone.

2. The method of maintaining within the range of about 160°–200° F. the temperature of a zone where solid sulfur particles falling through the air into a rotating bed of such particles are sprayed with molten sulfur which adheres to the surface of the falling particles, comprising the steps of:
   A. removing some of the particles from said bed;
   B. wetting the removed particles with a liquid; and
   C. dropping the wetted particles into said zone, whereby evaporation of the liquid from said wetted particles as they pass through said zone lowers the temperature of said zone.

3. The invention defined in claim 2, further comprising:
   A. returning the wetted particles to said bed;
   B. mixing the wetted particles with the other particles in said bed;
   C. elevating the mixed wetted and other particles above said zone; and
   D. dropping the mixture of wetted and other particles into said zone.

4. The invention defined in claim 2, further comprising wetting said removed particles by spraying them with a liquid at a location above said bed.

5. The method of maintaining within the range of about 160°–200° F. the temperature of a zone where solid sulfur particles falling through the air into a rotating bed of such particles are sprayed with molten sulfur which adheres to the surface of the falling particles, comprising the steps of:
   A. lifting some of the particles above said bed;
   B. wetting the lifted particles by spraying them with water;
   C. dropping the wetted particles to said bed;
   D. mixing the wetted particles with the other particles in said bed;
   E. elevating the mixed wetted and other particles above said zone; and
   F. dropping the mixture of wetted and other particles into said zone, whereby evaporation of the water from said wetted particles as they pass through said zone lowers the temperature of said zone.

6. The method of producing solid pellets comprising the steps of:
   A. forming an elongated bed of solid particles;
   B. continuously elevating particles from said bed to a zone above said bed;
   C. dropping the elevated particles in two separated, distinct, generally continuous curtains of particles which fall into said bed at spaced locations;
   D. spraying a substance which adheres to the surface of the falling particles into one of said curtains of particles;
   E. humidifying the other curtain of particles; and
   F. removing from said bed pellets larger than a predetermined size.

7. The invention defined in claim 6, wherein said solid pellets are sulfur and molten sulfur is sprayed into said one curtain of particles.

8. The invention defined in claim 7, wherein said other curtain of particles is humidified by spraying liquid into it above said bed.

9. The invention defined in claim 7, further comprising:
   A. inclining said elongated bed slightly with respect to the horizon from an entrance end to a discharge end; and
   B. rotating said bed with respect to its axis, whereby solid particles in said bed move from said entrance end to said discharge end.

10. The invention defined in claim 9, further comprising increasing the amount of sulfur sprayed into said one curtain from said entrance end to said discharge end of said bed.

11. The invention defined in claim 7, further comprising:
    A. lifting one elongated edge of said bed above the other elongated edge;

B. dropping one of said curtains of particles into said bed between the center of said bed and the higher of said edges; and
C. dropping the other curtain of particles into said bed between the center of said bed and the lower of said edges.

12. The invention defined in claim 7, further comprising spraying said other curtain of particles with water.

13. The invention defined in claim 7, further comprising removing pellets from said bed when the pellets become larger than about 2 to 20 m.m. in diameter.

14. The invention defined in claim 7, further comprising maintaining the temperature of said bed in the range of about 120°–180° F.

15. The invention defined in claim 7, further comprising maintaining the temperature of said zone above said bed in the range of about 160°–200° F.

16. The invention defined in claim 7, further comprising:
A. intermittantly raising the temperature of said bed by at least about 40° F. for brief periods, whereby sprayed sulfur adhering to the falling particles will remain at least partially plastic after said particles fall back into said bed; and
B. abrading the particles in said bed against each other while the temperature of said bed is raised so as to rub partially plastic sulfur from the sprayed particles and form sulfur seed nuclei capable of having their size increased.

17. The invention defined in claim 7, wherein said one curtain is about nine to twelve inches thick.

18. The invention defined in claim 7, wherein said other curtain is about one inch thick.

19. The method of producing solid generally spherical sulfur pellets comprising the steps of:
A. forming an elongated bed of solid sulfur particles;
B. inclining said elongated bed slightly with respect to the horizon from an entrance end to a discharge end;
C. rotating said bed with respect to its axis, whereby solid particles in said bed move from said entrance end to said discharge end;
D. lifting one elongated edge of said bed above the other elongated edge;
E. continuously elevating particles from said bed to a zone above said bed;
F. dropping the elevated particles in two separated, distinct, generally continuous curtains of particles which fall into said bed at spaced locations;
G. dropping one of said curtains of particles into said bed between the center of said bed and the higher of said edges;
H. dropping the other curtain of particles into said bed between the center of said bed and the lower of said edges;
I. spraying molten sulfur into one of said curtains of particles;
J. spraying said other curtain of particles with water above said bed;
K. maintaining the temperature of said bed in the range of about 120°–180° F.;
L. cooling said particles to a temperature in the range of about 120°–160° F.; and
M. removing from said bed cooled pellets larger than about 2 to 20 m.m. in diameter.

20. The method of producing sulfur seed particles capable of having their size increased until they are sulfur pellets larger than a predetermined size, comprising the steps of:
A. forming an elongated bed of solid sulfur particles of various sizes, and maintaining the temperature of said bed in the range of about 120°–180° F.;
B. rotating said bed;
C. continuously elevating particles from said bed;
D. dropping the elevated particles in a generally continuous curtain of particles which fall back into said bed;
E. coating the falling particles by spraying molten sulfur into said curtain of falling particles;
F. intermittantly raising the temperature of said bed by at least about 40° F. for brief periods, whereby sprayed sulfur coated on to the falling particles will remain at least partially plastic after said particles fall back into said bed; and
G. continuing to rotate said bed during the periods when it is at a raised temperature, thereby abrading the partially plastic sulfur coating from the sprayed particles so as to form sulfur seed particles.

21. The invention defined in claim 20, wherein said raised temperature is maintained for about 2% of the time.

22. The invention defined in claim 20, wherein said seed particles have a diameter in the size range of about 0.1 to 1.0 m.m.

23. The invention defined in claim 20, wherein the raised temperature is in the range of about 160°–220° F.

24. The invention defined in claim 20, further comprising:
A. dropping the elevated particles into two separated, distinct curtains of particles;
B. spraying molten sulfur into one curtain of particles;
C. spraying a liquid into the other curtain of particles to maintain the temperature of said bed in the temperature range of about 120°–180° F; and
D. raising the temperature of said bed by intermittantly ceasing to spray said liquid into said other curtain of particles.

25. The method of producing sulfur seed particles capable of having their size increased until they are sulfur pellets larger than a predetermined size, comprising the steps of:
A. forming an elongated bed of solid sulfur particles of various sizes, and maintaining the temperature of said bed in the range of about 120°–180° F.;
B. rotating said bed;
C. continuously elevating particles from said bed;
D. dropping the elevated particles into two separated, distinct curtains of particles;
E. coating the falling particles by spraying molten sulfur into one curtain of falling particles;
F. spraying water into the other curtain of falling particles to maintain said bed in the temperature range of about 120°–180° F.;
G. intermittantly raising the temperature of said bed by at least about 40° F. for about 2% of the time by ceasing to spray water into said other curtain for brief periods, whereby sulfur sprayed on to the falling particles will remain at least partially plastic after said particles fall back into said bed; and
H. continuing to rotate said bed during the periods when it is at a raised temperature, thereby abrading the partially plastic sulfur coating from the sprayed particles so as to form sulfur seed particles having a diameter in the size range of about 0.1 to 1.0 m.m.

26. The method of reducing the amount of sulfur dust emitted during the manufacture of solid sulfur pellets, comprising the steps of:
   A. increasing the size of sulfur particles as they move from an entrance end to the discharge end of a bed of such particles;
   B. removing a mixture of particles of various sizes including dust from said discharge end of said bed;
   C. separating sulfur pellets that are larger than a predetermined size from the mixture of particles and dust removed from said bed;
   D. transporting back to the entrance end of said bed, those remaining particles and dust in said mixture that are smaller than said predetermined size;
   E. classifying said mixture as to particle size so that at least some dust is located below the larger particles;
   F. dropping the classified mixture on to the entrance end of said bed so as to define a curtain of falling particles in which the dust located below the larger particles is concentrated on one side of such curtain; and
   G. spraying molten sulfur on to said one side of said falling curtain before the particles reach said bed, whereby dust is coated with molten sulfur and is prevented from escaping.

27. The invention efined in claim 26, wherein said mixture is classified by agitating said particles and dust while they are being transported from said discharge end to said entrance end.

28. The invention defined in claim 26, further comprising spraying molten sulfur on both sides of said falling curtain.

29. The invention defined in claim 26, wherein said falling curtain is about one inch thick.

30. The method of reducing the amount of sulfur dust emitted during the manufacture of solid sulfur pellets, comprising the steps of:
   A. increasing the size of sulfur particles as they move from an entrance end to the discharge end of a bed of such particles;
   B. removing a mixture of particles of various sizes including dust from said discharge end of said bed;
   C. separating sulfur pellets that are larger than a predetermined size from the mixture of particles and dust removed from said bed;
   D. transporting back to the entrance end of said bed, those remaining particles and dust in said mixture that are similar than said predetermined size;
   E. classifying said mixture as to particle size by vibrating said particles and dust while they are being transported from said discharge end to said entrance end so that at least some dust is located below the larger particles.
   F. dropping the classified mixture on to the entrance end of said bed so as to define a curtain of falling particles about one inch thick in which the dust located below the larger particles is concentrated on one side of such curtain; and
   G. spraying molten sulfur on said one side of said falling curtain before the particles reach said bed, whereby dust is coated with molten sulfur and is prevented from escaping.

31. The method of producing solid sulfur pellets comprising the steps of:
   A. forming an elongated bed of solid sulfur particles;
   B. continuously elevating particles from said bed to a zone above said bed;
   C. dropping the elevated particles in two separated, distinct, generally continuous curtains of particles which fall into said bed at spaced locations;
   D. spraying molten sulfur into one of said curtains of particles;
   E. humidifying the other curtain of particles;
   F. removing a mixture of particles of various sizes including dust from one end of said bed;
   G. separating sulfur pellets that are larger than a predetermined size from the mixture of particles and dust removed from said bed;
   H. transporting back to the other end of said bed, those remaining particles and dust in said mixture that are smaller than said predetermined size;
   I. classifying said mixture as to particle size so that at least some dust is located below the larger particles;
   J. dropping the classified mixture on to said other end of said bed so as to define a third curtain of falling particles and dust in which the dust located below the larger particles is concentrated on one side of said third curtain; and
   K. spraying molten sulfur on said one side of said third curtain before the particles reach said bed, whereby dust is coated with molten sulfur and is prevented from escaping.

32. The invention defined in claim 31, further comprising increasing the amount of sulfur sprayed into said one curtain from said other end to said one end.

33. The invention defined in claim 31, further comprising:
   A. rotating said bed while maintaining the temperature of said bed in the range of about 120°–180° F.;
   B. intermittantly raising the temperature of said bed by at least about 40° F., for brief periods, whereby sprayed sulfur on to the falling particles will remain at least partially plastic after said particles fall back into said bed; and
   C. continuing to rotate said bed during the periods when it is at a raised temperature, thereby abrading the partially plastic sulfur coating from the sprayed particles so as to form sulfur seed particles having a diameter in the range of about 0.1 to 1.0 m.m.

* * * * *